(12) United States Patent
Garcia

(10) Patent No.: US 7,516,569 B2
(45) Date of Patent: Apr. 14, 2009

(54) METHOD OF ADVERTISING FOR HOTELS AND LODGES

(76) Inventor: David Garcia, 8930 State Road 84, #285, Fort Lauderdale, FL (US) 33324

( * ) Notice: Subject to any disclaimer, the term of this patent is extended or adjusted under 35 U.S.C. 154(b) by 127 days.

(21) Appl. No.: 11/161,595

(22) Filed: Aug. 9, 2005

(65) Prior Publication Data

US 2006/0089879 A1    Apr. 27, 2006

Related U.S. Application Data

(60) Provisional application No. 60/522,064, filed on Aug. 10, 2004.

(51) Int. Cl.
*G09F 3/14* (2006.01)
(52) U.S. Cl. .................. 40/665; 5/636; 40/299.01
(58) Field of Classification Search .............. 40/665, 40/229.01; 5/636, 492, 496
See application file for complete search history.

(56) References Cited

U.S. PATENT DOCUMENTS

| | | | | |
|---|---|---|---|---|
| 598,028 | A * | 1/1898 | Smith | 248/174 |
| 2,299,697 | A * | 10/1942 | Gruber | 24/17 R |
| 5,487,924 | A * | 1/1996 | Fritze | 428/5 |
| 5,548,858 | A * | 8/1996 | Shoa | 5/413 R |
| 5,718,010 | A * | 2/1998 | Beier | 5/636 |
| 6,685,024 | B1 * | 2/2004 | Matthews | 206/521 |
| D496,860 | S * | 10/2004 | Mametja | D9/434 |
| 7,047,678 | B1 * | 5/2006 | Hall et al. | 40/299.01 |

OTHER PUBLICATIONS

Toilet Seat Bands, National Hospitality Supply Hotel Catalog, May 2003, http://web.archive.org/web/20030530173335/www.nathosp.com/NatHospInfo/Pages/hotel_cat/bath/ba_071_full.html.*

* cited by examiner

*Primary Examiner*—Cassandra Davis
(74) *Attorney, Agent, or Firm*—Malin Haley DiMaggio Bowen & Lhota, P.A.

(57) ABSTRACT

A method and system for advertising that includes preparing a band that includes printed indicia around a pillow in a hotel or the like that includes promotional benefits to the customer that would conventionally replace a typical chocolate placed on the pillow.

3 Claims, 1 Drawing Sheet

METHOD OF ADVERTISING FOR HOTELS AND LODGES

DESCRIPTION

1 Field of the Invention

This invention relates to a method and system for advertising for hotels, motels, cruise lines and lodges where guests spend the night and, specifically, to an improved advertising program for overnight guests that includes providing advertising materials on a medium that is banded around a guest's pillow.

2 Description of Related Art

The lodging industry has a long-established custom, especially in exclusive hotels and motels and other bed and breakfast or overnight establishments, of placing a chocolate on the pillow of a guest as a gift to the guest for using the hotel. In fact, many people cannot eat chocolate for health reasons and others believe that they should not eat chocolate because of the sugar content and for dietary reasons. Having been accustomed to receiving a chocolate on the pillow, however, an arriving guest would rather receive relevant information about the hotel, a monetary discount to promote the hotel or surrounding area businesses, or instructions for television or movies after a long day of travel as a true gift rather than a chocolate. Based on this premise, the present invention provides an extremely effective advertisement method and system to increase the hotel's image to the guest's hotel experience, including a personal touch.

SUMMARY OF THE INVENTION

A method and system for increasing a hotel customer's positive perception of services at a hotel and increasing business or revenue for the hotel, including the steps of creating an advertising band made of paper, vellum or other material that is sized for easy attachment around a guest's pillow for viewing at bed cover turndown and printing an advertising message in the form of alphanumeric indicia or pictures or both on the band that may include hotel information such as discounts and other hotel services that are available to the guest. The band, which may include adhesive or a tongue and groove die cut for connecting together two opposing ends of said band, may be constructed of a sufficient length to allow selection of the radius size of the band so that said band can be easily made for use on various sizes of pillows. The indicia would typically be printed on one side of the band that would be visible to the guest once the bed cover is turned down and exposing the pillow to the guest. The indicia may be any type of information, explanation of hotel services, map, diagram or any form of advertisement especially if the indicia offer a promotional gift such as discounts to the hotel guest for certain services. The particular advertisements that are affixed to the band could be customer service messages with valuable promotional and discount offers.

The pillow indicia band will enhance the overall pleasurable experience of each guest and gives the guest an indication that the pillow is sanitized and freshly attended to. This method can increase the goodwill and revenue stream of the hotel. This provides an unexpected beneficial alternative to the conventional chocolate on the pillow. This method also promotes hotel amenities that are available to the guests. Other advantages of the invention include assisting new business and also capturing repeat business.

The structure of the medium used is rather non-complex. A thin band of material that can receive printed indicia can be used. The pillow band can be a few or several inches wide. The length of the band is sufficient to extend around a conventional sleeping pillow with overlap for connection of the two opposing ends of said band by an adhesive. The band can also have die cut slits or adhesive along a portion of its length. The band length can be variable based on the overlap distance and die cut or adhesive engagement position to vary the diameter. The indicia on each band can be printed in large volumes and easily delivered to the particular hotel, lodge, cruise ship or motel. For installation, the maid or cleaning crew could be used to install when the bed sheets and pillow cases are changed so that the task is a very simple step for the maid service or cleaning crew to add the advertising band to the pillow. The message indicia on the medium could also include information that is in the form of a greeting card message, such as a Valentine's Day greeting or birthday greeting.

An object of this invention is to provide an improved advertising method and medium to increase business for hotels, motels and overnight lodging.

Another object of this invention is to provide an improved advertising method for increasing overnight guest business that also takes advantage of the well-known technique of providing a chocolate on the pillow of a guest.

Still another object of this invention is to enhance the overall pleasant experience of a guest at a hotel using the present invention for revenue increase and promotions directed to the guest through a low cost advertising program.

Another object of this invention is to provide a pillow band to show the bed was recently attended to and the bedding changed.

In accordance with these and other objects which will become apparent hereinafter, the instant invention will now be described with particular reference to the accompanying drawings.

DETAILED DESCRIPTION

Figure 1:
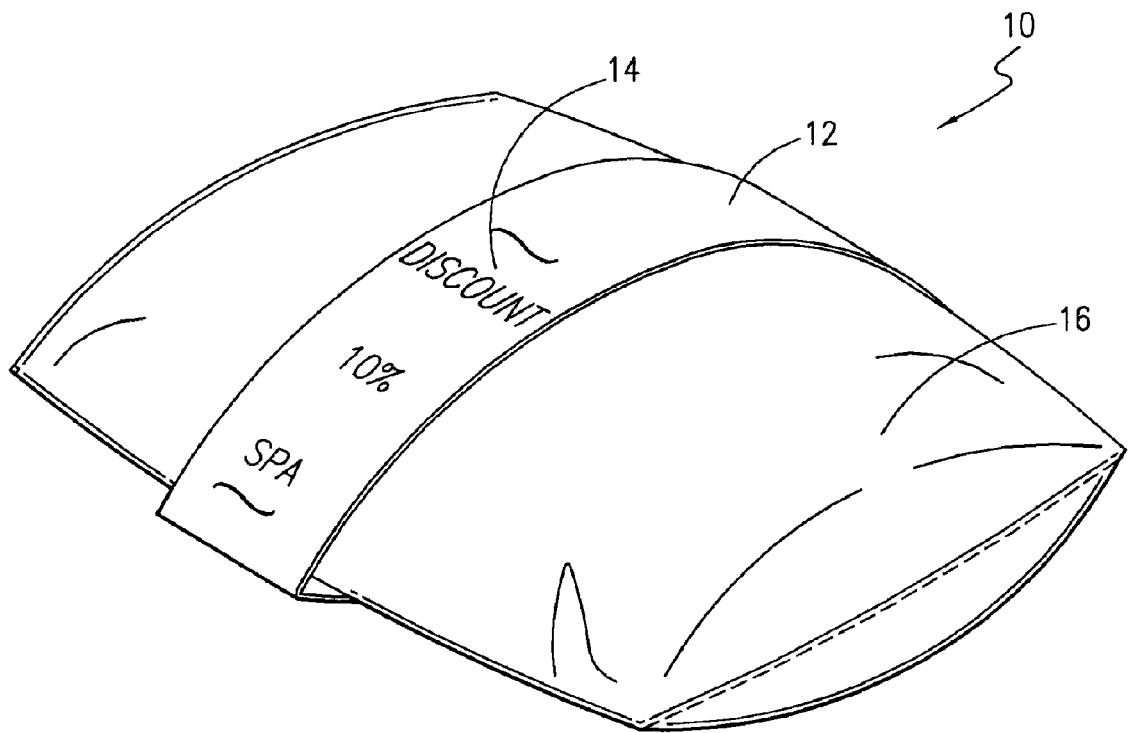
FIG. 1 shows a perspective view of the present invention.
Figure 2:
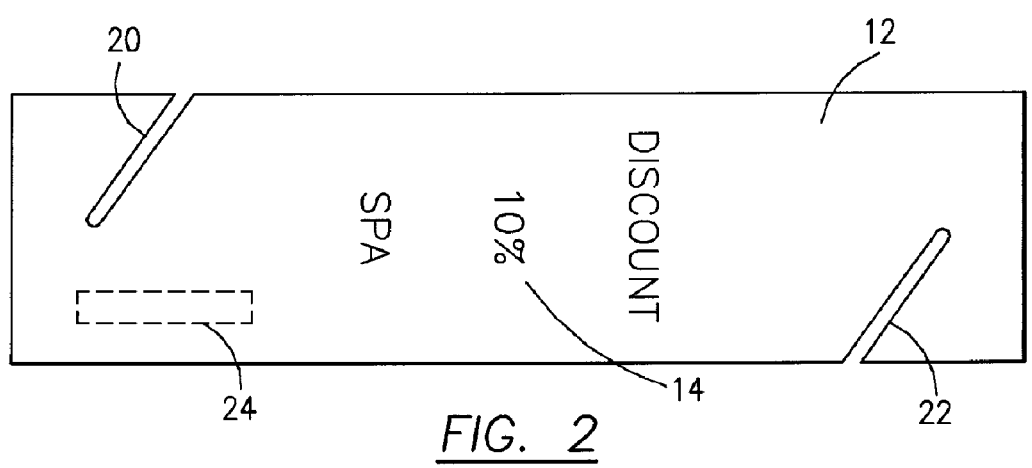
FIG. 2 shows a top plan view of the best mode using die cut slits to form the band of the present invention.

Referring now to FIG. 1 and FIG. 2, the present invention is shown generally at 10 comprised of a vellum band 12 that may be sized in length to completely encircle a conventional pillow 16 used for sleeping and have indicia 14 printed on one portion of the vellum band. The band 12 is formed by joining together die cut slits 20 and 22 in the vellum band near each end. The printed indicia 14 shows an advertisement that recommends a discounted hotel service. The indicia 14 could include any type of alphanumeric information, pictures, text, or diagrams. The band 12 could also be scented. By using a vellum band 12 around the pillow 16, the suggestion that was based on a typical chocolate being placed on a pillow is overcome with a very unexpected benefit to the guest by receiving a promotional message that may include a discount for a desired service.

The vellum band 12 is installed on a conventional sleeping pillow 16 that is covered by a pillow case. Installing the vellum band 12 is a matter of sliding the vellum band 12 around one end of the pillow case and joining the die cut slits 20 and 22 or adhesive 24. A light, non-permanent tacking adhesive 24 could be used on one side of the band 12 to attach the band directly around and to the pillow case eliminating the die cut slits 20 and 22. In an alternate embodiment, the band 12 does not need to encompass the pillow for 360 degrees.

Certainly, the band 12 can be made of materials other than vellum, including, but not limited to, paper, heavier paper, or plastic.

One method of installation is to have the maid or cleaning person that changes the pillow cases actually install the vellum band during the maid's normal rounds so that the pillow advertisements are ready for each guest as the guests arrive. An alternative to having a complete band affixed around the pillow is to use a partial band that could be placed on top of the pillow or somehow affixed to the pillow so that the advertisement could be easily removed by the guest, or fit partially around the pillow, without having to destroy the band.

The band is initially constructed as a paper or vellum strip approximately four inches wide and 41 inches long with the two die cut slits 20 and 22 shown in FIG. 2. The die cut slits 20 and 22 are joined to form a band that surrounds the pillow 16.

In an alternate embodiment, an adhesive strip 24 can be affixed to the band surface on one side to form an adjustable diameter band or stick to the pillow case temporarily.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method of advertising for businesses that provide overnight lodging such as hotels and motels that provides an overnight guest with a reward that is a substitute for placing a chocolate on the pillow of the guest comprising the steps of:
   providing a bed in a room for overnight lodging, said bed having at least one pillow and pillow case for sleeping;
   providing said sleeping pillow with a band that includes printed indicia on at least one side of the band that provides the overnight guest with a reward that includes instructions that instructs the guest about the reward, said reward being a substitute for a chocolate being placed on the pillow of the overnight guest;
   installing said reward bearing band on said pillow when said pillow case is changed, said installed band indicating that said pillow case is fresh;
   ensuring that said reward band is wrapped and circled around said fresh pillow in lieu of a chocolate for discovery by the overnight guest upon entry to the room when the pillow is exposed;
   providing said reward to the overnight guest;
   placing a pair of die cut slits near each end of said band; and
   wrapping the band entirely around the pillow by joining together said die cut slits in the band located near each end of said band.

2. The method as in claim 1, including the step of:
   said reward described on said band including a monetary discount available from said overnight lodging facility and reduced discount amenities while the guest is staying at the hotel.

3. A method of advertising for businesses that provide overnight lodging such as hotels and motels that provides an overnight guest with a reward that is a substitute for placing a chocolate on the pillow of the guest comprising the steps of:
   providing a bed in a room for overnight lodging, said bed having at least one pillow and pillow case for sleeping;
   providing said sleeping pillow with a band that includes printed indicia on at least one side of the band that provides the overnight guest with a reward that includes instructions that instructs the guest about the reward, said reward being a substitute for a chocolate being placed on the pillow of the overnight guest;
   installing said reward bearing band on said pillow when said pillow case is changed, said installed band indication that said how case is fresh;
   ensuring that said reward band is wrapped and circled around said fresh pillow in lieu of a chocolate for discovery by the overnight guest upon entry to the room when the pillow is exposed;
   providing said reward to the overnight guest; and
   providing a scent on the band bearing the guest reward.

* * * * *